United States Patent

Bell

(10) Patent No.: US 7,565,676 B2
(45) Date of Patent: Jul. 21, 2009

(54) PORTABLE DEVICE FOR RECEIVING MEDIA CONTENT

(75) Inventor: David A. Bell, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 378 days.

(21) Appl. No.: 10/596,837

(22) PCT Filed: Jan. 11, 2005

(86) PCT No.: PCT/IB2005/050118

§ 371 (c)(1),
(2), (4) Date: Jun. 27, 2006

(87) PCT Pub. No.: WO2005/069108

PCT Pub. Date: Jul. 28, 2005

(65) Prior Publication Data

US 2007/0150592 A1    Jun. 28, 2007

(30) Foreign Application Priority Data

Jan. 13, 2004    (GB) ................. 0400658.1

(51) Int. Cl.
| | |
|---|---|
| H04N 7/173 | (2006.01) |
| H04N 7/16 | (2006.01) |
| H04N 7/20 | (2006.01) |
| H04K 1/00 | (2006.01) |
| G06F 15/16 | (2006.01) |
| G06F 1/00 | (2006.01) |
| G06F 9/44 | (2006.01) |
| G06F 9/445 | (2006.01) |
| H04H 20/71 | (2008.01) |
| H04M 3/00 | (2006.01) |

(52) U.S. Cl. ............... 725/105; 725/62; 725/63; 725/73; 705/52; 709/201; 709/217; 713/340; 717/170; 717/172; 717/177; 455/3.03; 455/420

(58) Field of Classification Search ............ 725/62, 725/63, 73, 74, 105, 106, 135, 143; 705/14, 705/50–53; 717/168, 171–174, 176–178; 707/104.1; 713/340; 709/201, 217, 229; 715/200–204, 209, 210; 455/3.01, 3.03, 455/403, 412.1, 412.2, 414.1, 418–420
See application file for complete search history.

(56) References Cited

U.S. PATENT DOCUMENTS

| 6,584,825 B2 * | 7/2003 | Pratt et al. ............... 73/23.2 |
| 7,028,203 B2 * | 4/2006 | Nakai ....................... 713/340 |
| 7,142,204 B2 * | 11/2006 | Shiotsu et al. ............ 345/211 |

(Continued)

*Primary Examiner*—Crystal J Barnes Bullock (57) ABSTRACT

A portable device (200, 210) comprises a power source (70) and a processing system (15, 20, 25, 30, 35) for processing media content received from a service provider (100) via a delivery channel. A control apparatus (50, 60) determines remaining capacity of the power source (70) and receives information from the service provider (100) about available delivery parameters for an item of content. The control apparatus determines an operating duration for the device based on the delivery parameters and the remaining capacity of the power source and sends a request to the service provider (100) specifying at least one delivery parameter for delivery of the content. By specifying what format the service provider (100) should deliver the content, power savings can be made in the processing (20, 30) and rendering (25, 35) stages and in the receive chain of the portable device. Selection of delivery parameters can be automatic or under user control.

23 Claims, 5 Drawing Sheets

U.S. PATENT DOCUMENTS

| | | | |
|---|---|---|---|
| 7,219,153 B1 * | 5/2007 | Day | 709/229 |
| 7,278,167 B2 * | 10/2007 | Nakamura | 726/29 |
| 2003/0018581 A1 * | 1/2003 | Bratton et al. | 705/50 |
| 2006/0039469 A1 * | 2/2006 | Leibbrandt | 375/240.08 |

* cited by examiner

PORTABLE DEVICE FOR RECEIVING MEDIA CONTENT

This invention relates to portable devices which receive media content from a service provider.

There is an increasing use of portable devices such as mobile phones, Personal Digital Assistants (PDAs), portable media players and portable computers. Portable devices derive their power from a battery housed within the device, which can be replaced or recharged when the battery has become discharged. Manufacturers of portable devices struggle to find a compromise between providing a battery which has sufficient capacity to provide a useful operating time for the portable device and providing a battery whose physical dimensions and weight are small enough that they do not hinder the portability of the device.

As additional features are added to portable devices, devices have increased their power requirements. Portable devices which are capable of receiving or transmitting streamed content over the air (e.g. MPEG-4 audio/video) place particularly heavy demands on the battery. Encoding and decoding of video content is processor-intensive and makes greater demands on the transmit/receive chain. The battery life of a third generation (3G) portable handset can be reduced to little more than 1 hour when used for video calls.

Advances in battery technology have increased the capacity of batteries. However, the increasing demands of devices have generally overtaken the rate at which battery technology is evolving.

US2003/0142087 describes a notebook computer which can receive both standard definition and high definition broadcast television signals. The computer calculates a potential viewing duration and selects one of the two signals, based on the calculation. This requires multiple channels to be simultaneously broadcast.

The present invention seeks to provide a way of operating a portable device which addresses some of the limitations of using a limited power source.

Accordingly, a first aspect of the present invention provides a control apparatus for a portable device, the portable device comprising a power source and a processing system for processing media content received from a service provider via a delivery channel, the control apparatus being arranged to:
   determine remaining capacity of the power source;
   receive information from the service provider about available delivery parameters for an item of content;
   determine an operating duration for the device based on the delivery parameters and the remaining capacity of the power source; and
   send a request to the service provider specifying at least one delivery parameter for delivery of the content based on the determination of operating duration.

The portable device is able to request that the service provider delivers the content in a manner which is compatible with the power available to the portable device. Portable devices with a high-capacity battery or a newly recharged battery are capable of processing the media content at a high quality while devices with a smaller capacity battery or a battery which has low remaining charge will only be capable of processing the media content at a lower quality. As the portable device indicates its requirements to the service provider, the service provider can tailor delivery of the content to a form appropriate to the device. This conserves bandwidth as the service provider does not need to simultaneously transmit multiple versions of the same content. By specifying what format the service provider should deliver the content, power savings can be made in the processing and rendering stages of the portable device. Savings can also be made in the receive chain of the portable device since receiving a lower bit rate stream will cause the receive chain to consume less power. Power and processing savings can also be made at the service provider.

Portable devices which make use of this invention can include mobile phones, personal digital assistants (PDAs), portable audio or video players and portable computers. The invention is most applicable to portable devices which receive content from a service provider via a network connection, such as a local area network (LAN), wide area network (WAN) or other communications network. The delivery channel between the service provider and portable device can be narrowband or wideband.

The media content can include audio, still images, video or any combination of these.

The functionality described here can be implemented in software, hardware or a combination of these. The invention can be implemented by means of hardware comprising several distinct elements, and by means of a suitably programmed computer. Accordingly, another aspect of the invention provides software for controlling operation of a portable device comprising a power source and a processing system for processing media content received from a service provider via a delivery channel, the software being arranged to cause a processor of the portable device to perform the steps of:
   determining remaining capacity of the power source;
   receiving information from the service provider about available delivery parameters for an item of content;
   determining an operating duration for the device based on the delivery parameters and the remaining capacity of the power source; and sending a request to the service provider specifying at least one delivery parameter for delivery of the content based on the determination of the operating duration.

It will be appreciated that software may be installed on the portable device at the time of manufacture or at any point during the life of the equipment as an upgrade. The software may be stored on an electronic memory device, hard disk, optical disk or other machine-readable storage medium. The software may be delivered as a computer program product on a machine-readable carrier or it may be downloaded directly to the portable device via a network connection.

Further aspects of the invention provide a portable device incorporating the control apparatus, a method of operating a portable device and a method of delivering media content to a portable device.

Embodiments of the present invention will now be described, by way of example only, with reference to the accompanying drawings, in which.

Figure 1:
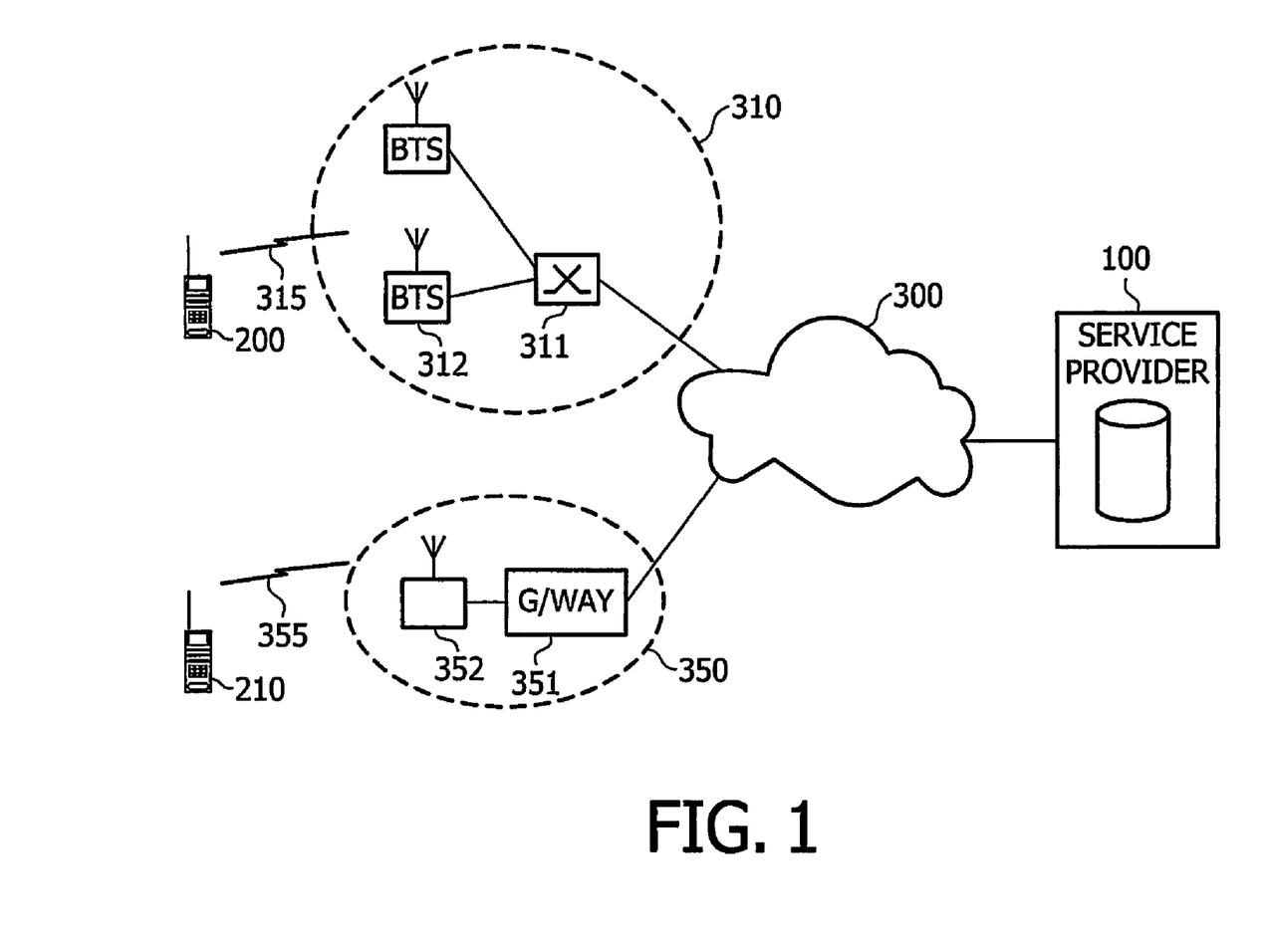
FIG. 1 shows a network in which the invention may be used.

FIG. 1 shows an example network in which content can be delivered to portable devices 200, 210. Content is stored at a service provider of a service provider 100. Portable devices 200, 210 can communicate with the service provider 100 via a connection which is made across networks 300, 310 and 350. Two examples of wireless access networks are shown. Network 310 represents a cellular network, such as one based on GSM or UMTS 315, with switching centres 311 and base transceiver stations (BTS) 312. Network 350 represents a wireless local area network (LAN) or personal area network (PAN) which connects to network 300 via a gateway 351/transceiver 352. The wireless connection 355 can be of any suitable type, such as the IEEE 802.11 family of protocols or Bluetooth. The network 350 may represent a wireless access point such as at an airport or other public place. It will be appreciated that the network connecting the portable devices 200, 210 to the service provider 100 can take many other forms and the detail is not important to the present invention.

Figure 2:
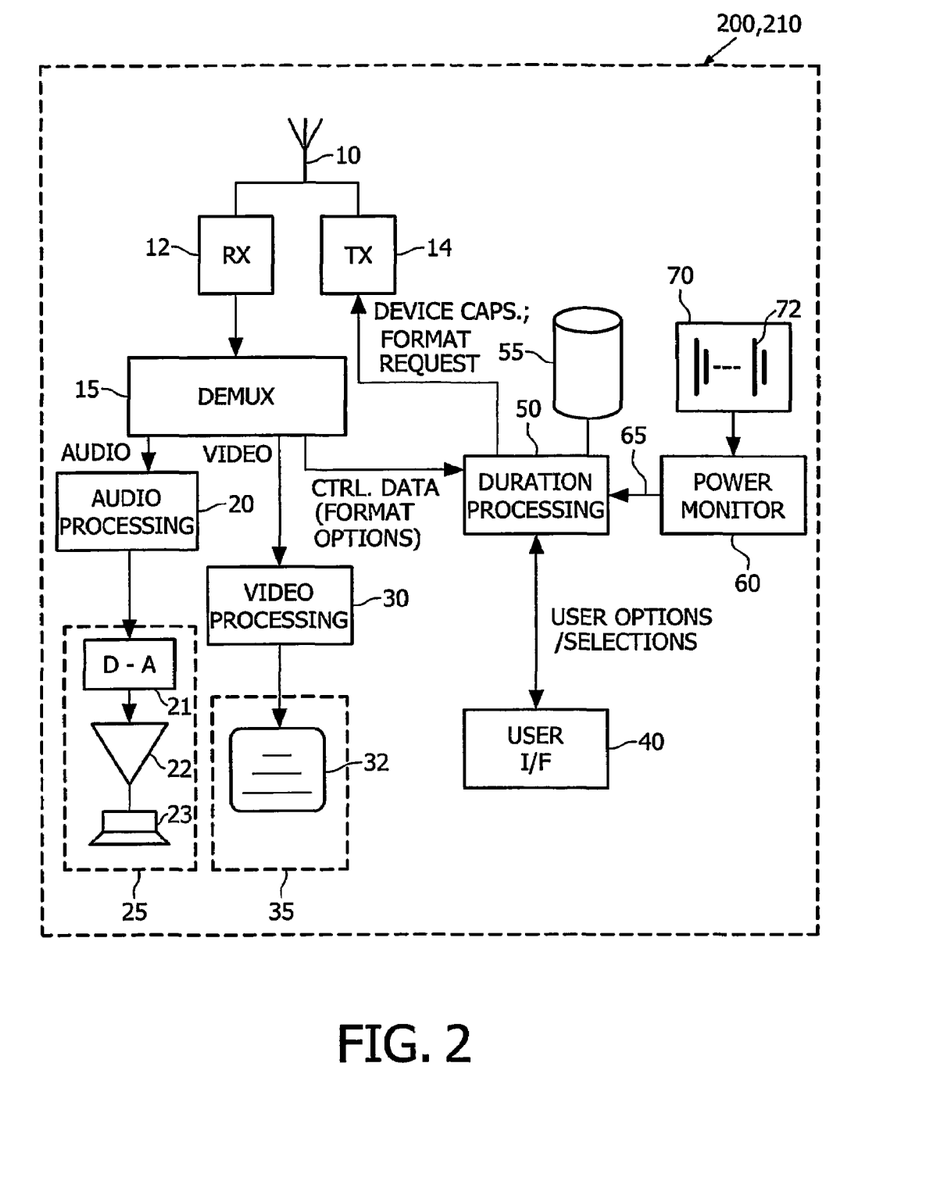
FIG. 2 shows a portable device embodying the invention.

FIG. 2 shows the main functional blocks of the portable devices 200, 210. An antenna 10 connects to a receive chain 12 and a transmit chain 14. The receive chain 12 includes conventional tuning and demodulation circuitry appropriate to the transmission frequency and format of the wireless signals which are being received. A demultiplexing function 15 extracts data streams representing audio, video and other control data from the demodulated data stream. Audio data is processed by an audio processing unit 20 and rendered for presentation by an audio rendering unit 25, which typically includes a digital-to-analog conversion stage 21, an amplifier 22 and a loudspeaker 23. Video data is processed by a video processing unit 30 and rendered for presentation by a video rendering unit 35 which includes a display 32. The audio and video processing units 20, 30 are each capable of decoding data in a variety of ways. Taking the example of audio, the audio processing unit 20 can include a particular decoder which can be operated at a range of possible. bit rates. The audio processing unit may offer a range of different decoder types, such as Code Excited linear Prediction (CELP) and Advanced Audio. Compression (AAC). Similarly, the video processing unit 30 can support a range of video data bit rates and can offer a range of different decoder types. Data received from the service provider specifies the different formats which are available for delivery of the media content. This data can be received as part of an initial signalling exchange between the portable device 200, 210 and service provider 100.

A wide range of adjustments are possible to a media stream to reduce the power consumption required at the portable device. For example, in the 'simple' case of receiving and playing a fixed length stream (e.g. a 30 minute movie) power is being consumed in receiving the movie data and then in decoding and rendering the data for presentation. Example characteristics which directly impact power consumption are:
video resolution—rendering at the Common Intermediate Format (CIF) of 352×288 pixels requires more power than rendering at the Quarter Common Intermediate Format (QCIF) of 176×144 pixels;
video frame rate—rendering at 30 frames per second (fps) requires more power than rendering at 15 or 6 fps;
audio/video compression—compression algorithms have differing processing requirements to decompress, which is further affected by settings specific to that algorithm;
quality—higher quality (i.e. smooth and no blocks) requires a greater amount of data which in turn requires a greater amount of processing;
audio format—stereo requires twice as much processing as mono, assuming a constant bit rate per channel.

MPEG-4 defines a range of different profiles and levels for audio and visual presentation. There are 19 visual profiles which range from 'Simple, Visual Profile' through to 'The Core Studio Profile' and 8 audio profiles. Each profile can also have one or more quality levels associated with it. The information received from the service provider 100, identifying what formats the media content is available in, can be in the form of a set of profile (and level) numbers. Each profile number, e.g. visual profile #1, represents a set of parameters for visual delivery and presentation which are understood by the portable device. Examples of two profiles established by the Internet Streaming Media Alliance (ISMA) are:

ISMA Profile 0: MPEG-4 video simple profile; video resolution QCIF (176×144 pixels) at up to 15 fps; high quality audio profile (CELP and low complexity AAC); max. data rate 64 kbps;

ISMA Profile 1: MPEG-4 video simple or advanced simple profile; video resolution CIF (352×288) at up to 30 fps; high quality audio profile (CELP and low complexity AAC); max. data rate 1.5 Mbps.

Other profiles can be specified, providing the service provider 100 and portable device 200,210 both understand what these represent.

All of the functions of the portable device are powered by a power supply 70 which comprises one or more batteries 72. A power monitoring function 60 monitors the state of the supply 70 and supplies an output signal 65, representing the remaining power at any particular time, to a duration processing unit 50. The power monitoring function uses information about the total capacity of the battery, together with information about the rate of discharge to derive an expected remaining capacity.

Duration processing unit 50 also receives the data from the service provider 100 about available formats for transmitting the media content. Duration processing unit 50 uses the information about available formats, remaining power and data stored in memory 55 to calculate a range of presentation options for the user. The presentation options are sent to user interface 40. The user interface can comprise an overlay on display 32 and a keypad (not shown). Each presentation option includes an estimation of the time for which the portable device can operate in that option, given the present state of the power supply 70. It is preferred that at least one of the options presented to the user will allow the device to operate for a period which exceeds the duration of the item of media content. In order to calculate this,. the duration processing unit 50 makes use of information received from the service provider about the total duration of the item of content. Duration processing unit 50 receives a selection, from the user, of a presentation option and sends a request, via the transmit chain 14, to the service provider 100. The request can specify one or more individual parameters for the streaming operation, based on the selection made by the user, or a profile (and level) which represents a set of parameters.

The different audio and video processing states described above each consume a different amount of power. Data stored in memory 55 provides the duration processing unit 50 with information of estimated presentation duration for a range of different audio and video states. Preferably, this information is stored in memory 55 as part of the factory set data, which has been derived from laboratory tests of the portable device and power supply. However, it is also desirable that the data is updated based on actual performance of the device. This can be useful as the actual presentation duration can be less than the expected duration for reasons such as manufacturing tolerances in the power supply 70 and processing circuitry, the age of the batteries and factors of the operating environment, such as temperature.

Figure 3:
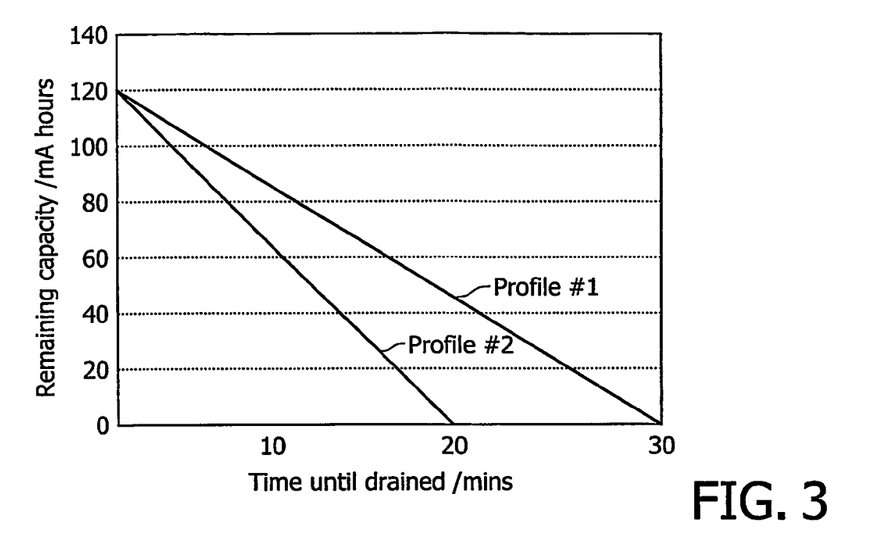
FIG. 3 shows a graph of power against time for different delivery formats.

FIG. 3 shows one example of a graph of battery capacity (in mA hours) against time for two different delivery/presentation profiles. Profile #2 shows an estimated life of 20 minutes while profile #1 shows an estimated life of 30 minutes. The graph may be non-linear, particularly as the batteries reach their lowest capacity. Also, the graph assumes constant operating characteristics. For a portable device which is moved around an area, power may be consumed at a greater (or lesser) rate than expected due to varying distances between the portable device and serving wireless base stations, which demands a varying transmit power on the uplink path. Furthermore, lo other features such as a backlit display will consume additional power. If it is found that power is being consumed at a greater rate than expected the portable device can request a further change in the delivery profile.

It is preferred that the presentation options sent to the user interface 40 are greatly simplified. For example, the different sets of detailed parameters. (bit rate, video quality, audio quality etc.) can be represented as a simple set of options with the titles 'high quality', 'medium quality', 'low quality'.

Memory 55 also stores information about the capabilities of the portable device. These include the supported audio and video decoder types, display capabilities (size, colour depth), bit rates which the receive chain and decoders can support. This information can be sent to the service provider during an initial signalling exchange.

Figure 4:
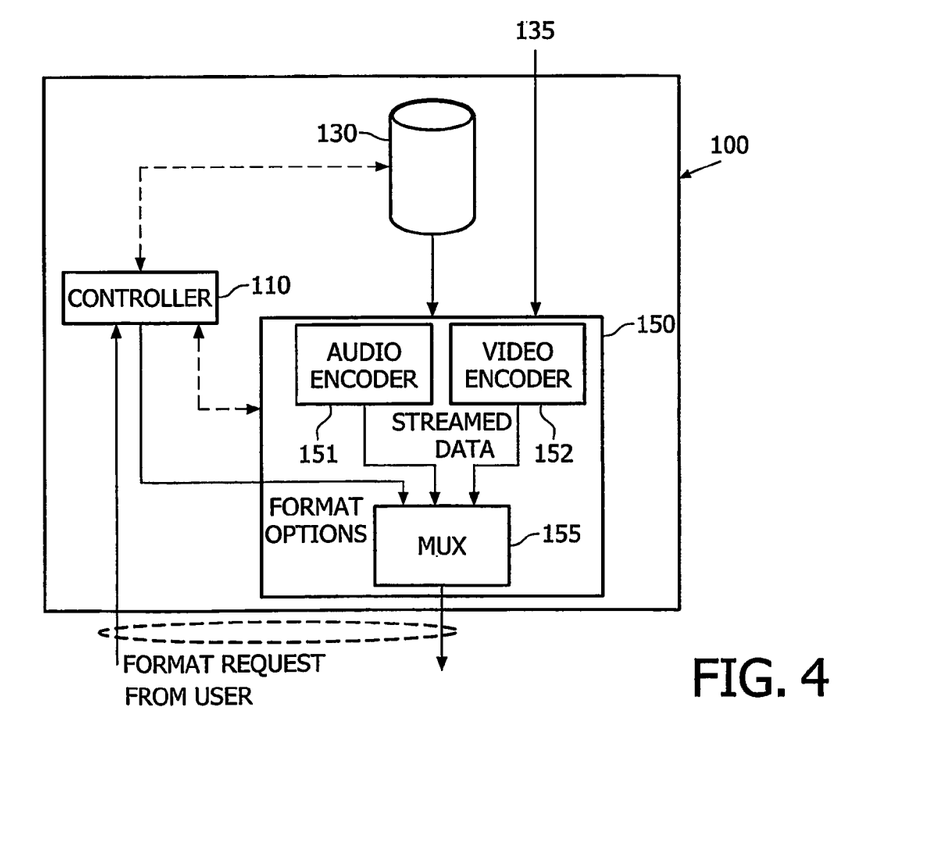
FIG. 4 shows a first embodiment of a service provider.

FIG. 4 shows the main features of a first embodiment of equipment at a service provider 100. Media content is stored on a server 130. Typically, server 130 comprises an array of storage devices. Delivery of content from the server 130 is controlled by a controller 110. Selected content is delivered to a processing unit 150. The processing unit 150 comprises an audio encoder 151 and a video encoder 152. The encoder units 151, 152 encode the data of the selected content according to format requirements specified by the controller 110. The resulting stream of data is multiplexed, by mux 155, and converted into a suitable form for transmission over network 300. Although media content can be stored in server 130 for selection on demand, it can alternatively be received from a live feed 135. The live feed 135 may represent, for example, a live radio or video broadcast. In use, the controller 110 can instruct the processing function 150 to select a different delivery format for the same hem of content in response to a request received from a portable device 200, 210. Preferably, the change to the new delivery format is as seamless as possible. A controlled transition from a first to a second format can be provided by causing delivery of the content in the first format to end at the same point in the hem of content as the delivery of the second format begins.

Figure 5:
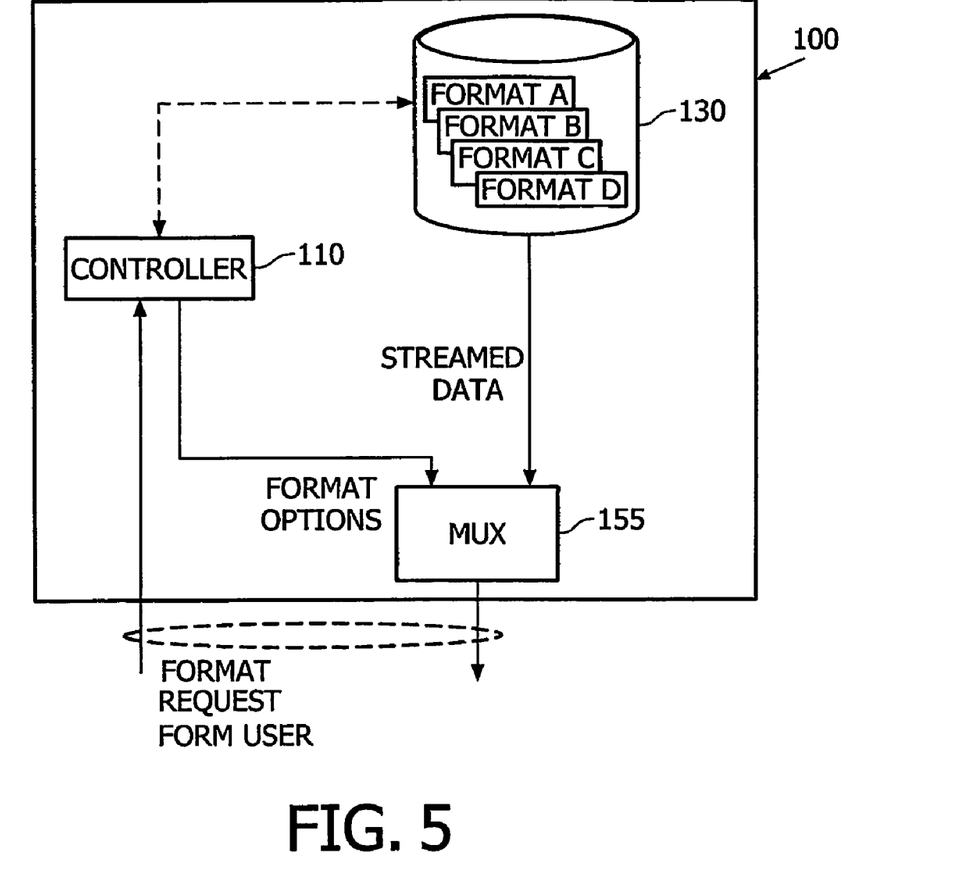
FIG. 5 shows a second embodiment of a service provider.

FIG. 5 shows an alternative embodiment of equipment at the service provider. Data is stored, on server 130, in a plurality of different formats. The formats can represent different delivery bit rates. As previously, selection of the particular format of the content is controlled by a controller 110. In use, the controller 110 can select a different format of the same item of content in response to a request received from a portable device, and instruct the server 130 to deliver the content in the new format via mux 155. Preferably, the change of format is as seamless as possible by coordinating a change between corresponding points, such as a frame number, in the two versions of the item of content.

Figure 6:
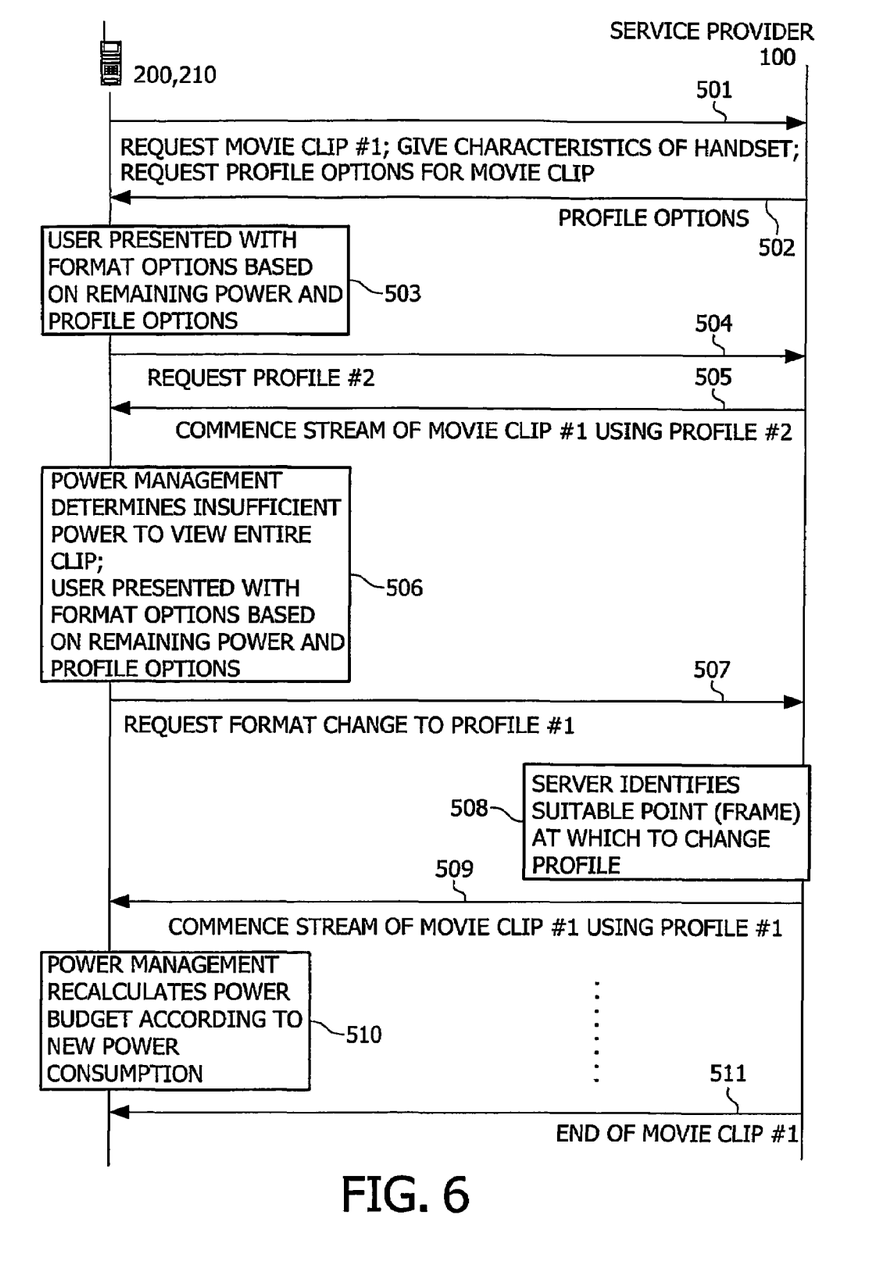
FIG. 6 shows signaling between the portable device and the service provider.

FIG. 6 shows signalling between the portable device 200, 210 and service provider 100. Although not shown, a portable device would initially receive a directory of available content for selection. At step 501 the portable device requests a particular movie clip (movie clip #1). The portable device also sends information about it's capabilities and requests the possible options for delivering the clip. At step 502 the service provider replies with the available profile options. Preferably, the service provider sends only those profile options which match the capabilities of the portable device. At step 503 the duration processing unit 50 of the portable device uses the profile information received from the service provider, together with information about the available power supply and stored data to derive a set of presentation options for the user. Once the user has selected a particular presentation option it is converted to a particular profile (in this case, profile #2) and at step 504 the required profile is requested from the service provider. At step 505 the service provider begins streaming the selected content in the selected format. During delivery and presentation of the selected content, the duration processing unit 50 of the portable device continues to monitor the available power supply. In the event that the available power supply falls more quickly than previously anticipated, the user can be presented with a further selection of possible presentation options (step 506) or the portable device can automatically select the best option. This process can be repeated a number of times during the streaming process to optimise the trade-off between stream quality and battery life. Considering an example where there is 30 minutes of a movie clip remaining but there is only 20 minutes of power available at the present rate of consumption, adjustments can be made to the stream to ensure that the user is able to watch the entire clip. The screen size can be reduced from CIF to QCIF, thereby greatly reducing the amount of data being received and processed. Alternatively, It may be possible to maintain the frame rate and size of picture but to lower the quality of the picture, or to reduce only the audio quality. As described above, there are many different possibilities for reducing power.

At step 507 the portable device requests a change of format, in this example to profile #1. At step 508, upon receiving the request for a format. change, the service provider identifies a suitable point at which to change the delivery format. At step 509 the service provider begins delivering the content in the new format. At step 510 the duration processing unit 50 of the portable device recalculates available presentation duration for the selected format. At step 511 the streaming ends.

As described above, the portable device presents the user with a range of possible presentation options for the media content. Most of the measures to improve battery life will reduce quality of the presentation of the media content and so it is preferred that this trade-off is under the control of the user. However, the portable device can be arranged to automatically select a presentation format. The basis for automatically selecting a presentation option can be:

(i) a format which will allow the user to view the entire item of content before the power supply expires. In order to achieve this, the duration processing unit makes use of information received from the service provider about the total duration of the item of content. The portable device may select the best available format which will allow the user to view the entire item of content.

(ii) a format which will use the least amount of power, and thereby allow the portable device to be used for the maximum amount of time. Typically, this will be the format with the lowest bit rate.

Automatic selection of a format avoids distracting the user with prompts, which some users may find annoying. The parameters for automatic selection can be specified by a user as part of the user preferences for the portable device. It is also possible for the device to revert to an automatic selection if a user does not select one of the available options at the user interface within a predetermined period of time, such as 15 seconds.

It is described how the capabilities of the portable device are stored in memory 55 and can be sent to a service provider, such as during an initial exchange. In order to reduce the signalling exchange, and hence bandwidth, the portable device may simply provide a code corresponding to the capabilities, rather than listing them in full, or it may refer the service provider to a location where the service provider can obtain details, such as a URL. Although it is not necessary for the portable device to provide the service provider with details about its capabilities, doing so allows the service provider to respond with delivery options that are compatible with the capabilities of the portable device.

In the above description the service provider 100 is shown as a single entity. However, in reality the functions of the service provider may be divided across two or more sites. In particular, the initial interaction can occur between a portable device 200, 210 and an internet store front or service gateway, which then refers the portable device to an appropriate streaming server which can deliver the content. Servers are typically distributed geographically to share load.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in the claim. Where the system/device/apparatus claims recite several means, several of these means can be embodied by one and the same item of hardware.

In the description above, and with reference to the Figures, there is described a portable device which comprises a power source 70 and a processing system 15, 20, 25, 30, 35 for processing media content received from a service provider 100 via a delivery channel. A control apparatus 50, 60 determines remaining capacity of the power source 70 and receives information from the service provider 100 about available delivery parameters for an item of content. The control apparatus determines an operating, duration for the device based on the delivery parameters and the remaining capacity of the power source and sends a request to the service provider 100 specifying at least one delivery parameter for delivery of the content. By. specifying what format the service provider 100 should deliver the content, power savings can be made in the processing 20, 30 and rendering 25, 35; stages and in the receive chain of the portable device. Selection of delivery parameters can be automatic or under user control.

The invention claimed is:

1. A control apparatus for a portable device, the portable device comprising a power source and a processing system for processing media content received from a service provider via a delivery channel, the control apparatus being arranged to:
   determine remaining capacity of the power source;
   receive information from the service provider about available delivery parameters for an item of content;
      determine an operating duration for the device based on the delivery parameters and the remaining capacity of the power source; and
      send a request to the service provider specifying at least one delivery parameter for delivery of the content, based on the determination of the operating duration.

2. A control apparatus according to claim 1 wherein the information received from the service provider includes a duration of the item of media content and the step of sending a request to the service provider comprises sending a parameter which will allow the portable device to operate for a period of time which equals or exceeds the duration of the item of media content.

3. A control apparatus according to claim 1 wherein the information received from the service provider indicates a plurality of alternative delivery parameters for the same item of content and the control apparatus is arranged to determine an operating duration for each of the alternative delivery parameters.

4. A control apparatus according to claim 1 which is arranged to determine an operating duration by making use of stored information about expected duration.

5. A control apparatus according to claim 4 which is further arranged to update the stored information based on actual performance of the portable device.

6. A control apparatus according to claim 1 which is further arranged to send information about available options for delivery of the media content to a user interface of the portable device.

7. A control apparatus according to claim 6 which is further arranged to receive, from the user interface, a selection of an available option and the step of sending a request to the service provider is based on the selection received from the user interface.

8. A control apparatus according to claim 1 which is further arranged to send information about the capabilities of the portable device to the service provider.

9. A control apparatus according to claim 1 wherein the delivery parameters include at least one of: delivery data rate, video quality, video format, video resolution, frame rate, colour depth and audio quality.

10. A control apparatus according to claim 1 wherein the media content is delivered to the portable device by a streaming operation.

11. A control apparatus according to claim 1 which is arranged to automatically send the request to the service provider based on stored user preferences.

12. A control apparatus according to claim 1 which is arranged to determine the operating duration and to send the request to the service provider during delivery of the media content.

13. A control apparatus according to claim 12 which is arranged to determine the operating duration a plurality of times during delivery of media content.

14. A portable device comprising a power source, a processing system for processing media content received from a service provider via a delivery channel and the control apparatus according to claim 1.

15. A method of operating a portable device which comprises a power source and a processing system for processing media content received from a service provider via a delivery channel, the method comprising:
   determining remaining capacity of the power source;
   receiving information from the service provider about available delivery parameters for an item of content;
   determining an operating duration for the device based on the delivery parameters and the remaining capacity of the power source; and
   sending a request to the service provider specifying at least one delivery parameter for delivery of the content based on the determination of the operating duration.

16. Software for controlling operation of a portable device comprising a power source and a processing system for processing media content received from a service provider via a delivery channel, the software being arranged to cause a processor of the portable device to perform the steps of:
   determining remaining capacity of the power source;
   receiving information from the service provider about available delivery parameters for an item of content;
      determining an operating duration for the device based on the delivery parameters and the remaining capacity of the power source; and sending a request to the service provider specifying at least one delivery parameter for delivery of the content based on the determination of the operating duration.

17. A method of delivering media content from a service provider to a portable device comprising:

sending information to the portable device about available delivery parameters for an item of media content;

receiving a request from the portable device specifying at least one delivery parameter for delivery of the content the parameter being selected by the portable device in response to determining an operating duration of the device based on the delivery parameters and the remaining capacity of the power source; and delivering the item of media content to the portable device using the requested parameter.

18. A method according to claim 17 further comprising receiving information about the capabilities of the portable device and the step of sending information to the portable device sends information about delivery parameters which are matched to the capabilities of the portable device.

19. A method according to claim 18 wherein the request is received during delivery of the media content and the service provider changes the delivery parameters of the item partway during delivery of the item.

20. A method according to claim 19 further comprising selecting a point in the delivery of the media content at which to change the requested parameter.

21. A method according to claim 20 wherein the point is selected such that it minimises disruption to the delivery of the media content.

22. A method according to claim 17 wherein the step of delivering the item of media content is a streaming operation.

23. Apparatus for performing the method according to claim 17.

* * * * *